(12) United States Patent
Fix et al.

(10) Patent No.: US 11,963,062 B1
(45) Date of Patent: Apr. 16, 2024

(54) SYSTEM AND METHOD FOR IDENTIFYING PRODUCT ENGAGEMENTS

(71) Applicant: Retail Aware, Inc., Omaha, NE (US)

(72) Inventors: Keith Fix, Omaha, NE (US); Nick Masur, Omaha, NE (US); Andrew Dierks, Omaha, NE (US)

(73) Assignee: Retail Aware, Inc., Omaha, NE (US)

( * ) Notice: Subject to any disclaimer, the term of this patent is extended or adjusted under 35 U.S.C. 154(b) by 0 days.

(21) Appl. No.: 17/116,891

(22) Filed: Dec. 9, 2020

Related U.S. Application Data

(63) Continuation-in-part of application No. 16/168,619, filed on Oct. 23, 2018, now abandoned.

(60) Provisional application No. 62/912,921, filed on Oct. 9, 2019, provisional application No. 62/575,859, filed on Oct. 23, 2017.

(51) Int. Cl.
*H04W 4/021* (2018.01)
*G06Q 30/0201* (2023.01)
*H04W 4/02* (2018.01)

(52) U.S. Cl.
CPC ........ *H04W 4/021* (2013.01); *G06Q 30/0201* (2013.01)

(58) Field of Classification Search
CPC .. H04W 4/021; H04W 4/025; G06Q 30/0201; G06Q 30/0251; H04L 67/18; H04L 67/306
See application file for complete search history.

(56) References Cited

U.S. PATENT DOCUMENTS

| | | | |
|---|---|---|---|
| 10,706,244 B2 * | 7/2020 | Wilkinson | G06Q 10/087 |
| 10,970,495 B2 * | 4/2021 | Tingler | G06K 7/10356 |
| 11,096,009 B2 * | 8/2021 | Skaaksrud | H04W 36/08 |
| 11,106,901 B2 * | 8/2021 | He | G06V 40/107 |
| 11,169,509 B2 * | 11/2021 | Cole | G05B 19/4183 |
| 11,682,277 B2 * | 6/2023 | Mullins | G08B 13/19615 |
| | | | 348/152 |
| 11,692,864 B2 * | 7/2023 | Zhu | G06Q 20/18 |
| | | | 235/383 |
| 2017/0164319 A1 * | 6/2017 | Skaaksrud | G06Q 10/0833 |
| 2018/0225744 A1 * | 8/2018 | Sorensen | G06Q 30/0635 |
| 2019/0050613 A1 * | 2/2019 | Wilkinson | G06K 7/10475 |
| 2020/0082692 A1 * | 3/2020 | Jeon | G08B 13/2402 |
| 2020/0162840 A1 | 5/2020 | Lipman et al. | |
| 2020/0193148 A1 * | 6/2020 | He | G06F 3/0304 |
| 2020/0334834 A1 * | 10/2020 | Fisher | G06T 7/292 |
| 2021/0056568 A1 * | 2/2021 | Chen | H04N 7/188 |
| 2021/0065105 A9 * | 3/2021 | Skaaksrud | G06Q 10/0835 |

(Continued)

*Primary Examiner* — Khawar Iqbal
(74) *Attorney, Agent, or Firm* — Suiter Swantz pc llo

(57) ABSTRACT

A system for identifying one or more product engagements includes one or more microsensors configured to measure one or more signals indicative of one or more near-product engagements within a retail environment. Near-product engagements product movement, customer proximity to products, temperature, and the like. In some embodiments, the system may be configured to generate spatial relationship data associated with one or more spatial relationships between one or more transmitting electronic devices and one or more sensor units. The system may perform one or more filtering steps on the near-product engagement or spatial relationship data and providing the filtered data to a user interface.

18 Claims, 7 Drawing Sheets

(56) References Cited

U.S. PATENT DOCUMENTS

2021/0201362 A1* 7/2021 Stern .................. G06Q 30/0261
2022/0309886 A1* 9/2022 Baker ................ G08B 13/2428

* cited by examiner

SYSTEM AND METHOD FOR IDENTIFYING PRODUCT ENGAGEMENTS

CROSS-REFERENCE TO RELATED APPLICATION

The present application claims the benefit of U.S. patent application Ser. No. 16/168,619, filed Oct. 23, 2018, which claims priority under 35 U.S.C. § 119(e) of U.S. Provisional Patent Application Ser. No. 62/575,859, filed Oct. 23, 2017, each of which is incorporated herein by reference in the entirety. The present application claims the benefit of U.S. Provisional Application Ser. No. 62/912,921, filed Oct. 9, 2019, which is incorporated herein by reference in the entirety.

TECHNICAL FIELD

The present invention generally relates to measuring and identifying product engagements within a retail environment, and, more specifically, measuring and identifying near-product engagements by a consumer within a retail environment.

INTRODUCTION

Tracking consumer trends and patterns is critical for both effective marketing and planning. For example, Google constantly tracks which websites get the most user traffic, or "hits." Similarly, online retailers are able to track not only how frequently each product is being purchased, but the frequency at which consumers view, but do not purchase, each product. Comparing the frequency at which particular products are viewed against the frequency at which those products are purchased may provide an online retailer with valuable information, including the overall consumer interest in a product and the willingness of interested consumers to actually purchase the product. While this information has proved valuable to online retailers, currently, there is no similar system or method with which physical retail stores may track and gather similar information. Therefore, it would be desirable to provide a method and system that cure the shortfalls of the previous approaches identified above.

BRIEF DESCRIPTION OF THE DRAWINGS

The numerous advantages of the disclosure may be better understood by those skilled in the art by reference to the accompanying figures in which.

SUMMARY

Figure 1:
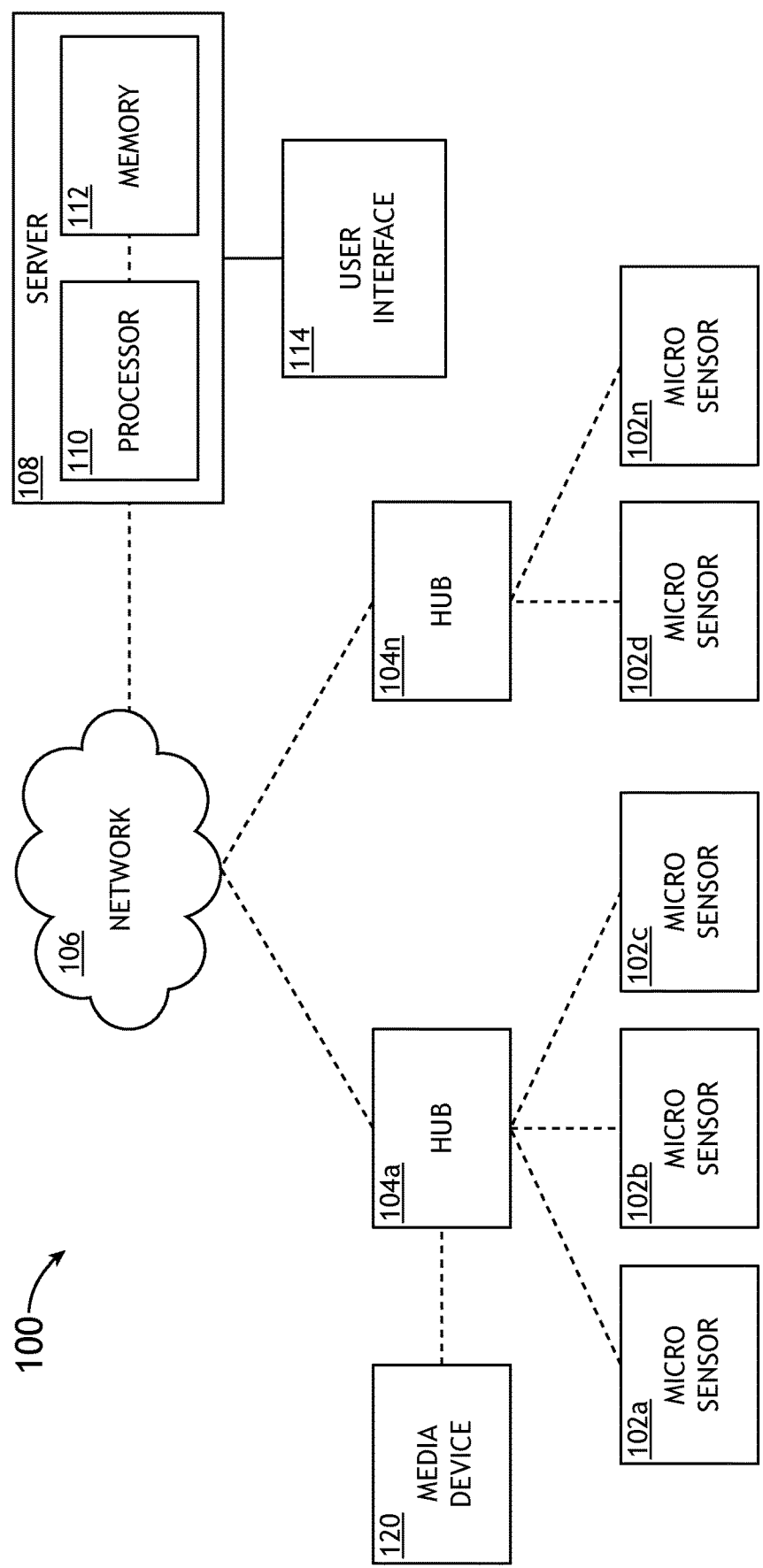
FIG. 1 illustrates a simplified block diagram of a system for identifying product engagements, in accordance with one or more embodiments of the present disclosure.

A system for identifying product engagements is disclosed. In one embodiment, the system includes one or more microsensors configured to measure one or more signals indicative of one or more near-product engagements within a retail environment. In another embodiment, the system includes one or more hubs communicatively coupled to each of the one or more microsensors and a network, wherein the one or more hubs are configured to receive the one or more signals indicative of one or more near-product engagements from the one or more microsensors and transmit the one or more signals indicative of one or more near-product engagements to the network. In another embodiment, the system includes one or more memory units. In another embodiment, the system includes one or more processors configured to execute a set of program instructions stored in the one or more memory units, wherein set of program instructions is configured to cause the one or more processors to determine one or more near-product engagements based on the one or more signals indicative of one or more near-product engagements. In another embodiment, the system includes one or more user interfaces.

A method is disclosed. In one embodiment, the method includes receiving one or more signals indicative of one or more near-product engagements from one or more microsensors within a retail environment. In another embodiment, the method includes transmitting the one or more signals indicative of one or more near-product engagements to a network. In another embodiment, the method includes determining one or more near-product engagements based on the one or more signals indicative of one or more near-product engagements.

A method is disclosed. In one embodiment, the method includes receiving one or more wireless signals transmitted by one or more transmitting electronic devices with one or more sensor units. In another embodiment, the method includes transmitting the one or more wireless signals to a server. In another embodiment, the method includes generating spatial relationship data associated with one or more spatial relationships between one or more transmitting electronic devices and one or more sensor units. In another embodiment, the method includes performing one or more filtering steps on the spatial relationship data. In another embodiment, the method includes transmitting the filtered spatial relationship data to a user interface. In another embodiment, the method includes providing one or more outputs based on the filtered spatial relationship data via the user interface.

DETAILED DESCRIPTION

Reference will now be made in detail to the subject matter disclosed, which is illustrated in the accompanying drawings. Referring generally to FIGS. 1-5, a system and method for identifying product engagements are illustrated, in accordance with one or more embodiments of the present disclosure.

Online retailers are able to track not only the frequency at which each product is being sold, but also the frequency at which consumers view, but do not purchase, each product. Comparing the frequency at which particular products are viewed against the frequency at which those products are purchased may provide an online retailer with valuable information. For example, if a particular product is being purchased substantially every time it is viewed, that may indicate to the retailer that the product is priced too low. By way of another example, if a product is being viewed frequently, but is rarely purchased, the retailer may surmise that there is substantial consumer interest in the product, but that it may be priced too high. All this information may allow the online retailer to operate more efficiently by adjusting its own inventory purchases and more effectively pricing products in relation to consumer demand. Conversely, there is no similar system or method which allows physical retailers (e.g., physical grocery stores, department stores, malls, and the like) to track consumer viewing habits product interactions/engagements.

In one embodiment, the system of the present disclosure may include one or more microsensors configured to measure one or more signals indicative of near-product engagements within a retail environment. In another embodiment, the system of the present disclosure may include one or more sensor units configured to receive signals emitted by one or more transmitting electronic devices. Transmitting electronic devices may include any electronic device configured to transmit wireless signals including, but not limited to, PEDs, desktop computers, smart speakers, smart lightbulbs, and the like. In another embodiment, the system of the present disclosure may be configured to determine a spatial relationship (e.g., distance) between one or more sensor units and one or more transmitting electronic devices. It is noted herein that the determination of a spatial relationship between one transmitting electronic device and one sensor unit may allow the system of the present disclosure to approximate the distance between the transmitting electronic device and the sensor unit. Similarly, it is noted that the determination of a spatial relationship between a transmitting electronic device and three or more sensor units may allow the system of the present disclosure to triangulate the transmitting electronic device's location to a single point.

In another embodiment, the system of the present disclosure may track spatial relationships between one or more sensor units and one or more transmitting electronic devices over a period of time. In this regard, embodiments of the present disclosure may track the position of one or more transmitting electronic devices relative to the one or more sensor units overtime. For example, a retail store may be equipped with three or more sensor devices. As a consumer walks around the store with a smartphone (e.g., PED or other transmitting electronic device) in their pocket, the system of the present disclosure may regularly and/or continuously determine spatial relationships between the smartphone and each of the three sensor units, thereby tracking the movement of the smartphone (and therefore the consumer) throughout the store.

It is noted that tracking and storing information regarding near-product engagements and the movement of transmitting electronic devices (and consumers) throughout a retail store may provide the retail store with valuable information. For example, the system of the present disclosure may be used to track and store the movement of transmitting electronic devices (and therefore consumers) throughout a retail store throughout the course of a day. Storing this spatial relationship data may provide the retailer with a substantial amount of information including, but not limited to, foot traffic patterns, congestion points within the store, which products are viewed most/least frequently, the number of consumers in the store throughout the day, and the like. Furthermore, it is noted that comparing the near-product engagement and stored spatial relationship data to the types and number of products sold may provide the retailer with additional information, including, but not limited to, the relative frequency at which products are viewed compared to the frequency at which those products are purchased. Furthermore, by using near-product engagement data and stored spatial relationship data to determine which products are viewed the most frequently, managers of the retail store may be able to place the most viewed products in such a manner which maximizes customer's exposure to other products throughout the store (e.g., placing the most viewed products at opposite ends of the retail store).

FIG. 1 illustrates a simplified block diagram of a system 100 for identifying product engagements, in accordance with one or more embodiments of the present disclosure.

In one embodiment, system 100 includes one or more microsensors 102, one or more hubs 104, a network 106, a server 108, one or more processors 110, memory 112, and one or more user interfaces 114. In some embodiments, the system 100 may include a media device 120.

In one embodiment, the one or more microsensors 102 comprise a first microsensor 102a, a second microsensor 102b, and an Nth microsensor 102n. It is noted herein that reference will be made particularly to the first microsensor 102a, and that the "microsensor 102a" may be generally referred to as "microsensor 102" Furthermore, it is noted that while much of the present description refers to specific microsensors 102 (e.g., 102a, 102b, etc.), embodiments of the present disclosure may be regarded as referring to one or more microsensors 102, including the first microsensor 102a, the second microsensor 102b, and the Nth microsensor 102n.

In some embodiments, the one or more microsensors 102 may be configured to measure one or more signals indicative of one or more near-product engagements within a retail environment 103. For example, the one or more microsensors 102 may be configured to measure one or more signals indicative of one or more interactions by a customer with a product located on a shelf within a retail store. For purposes of the present disclosure, a retail environment may include, but is not limited to, any environment in which patrons or other invitees are permitted to shop and/or otherwise browse for products available for sale. In this way, the one or more microsensors 102 may be configured to detect and/or identify a customer interaction (e.g., pick product up off a shelf, return product to a shelf, approach a shelf, open and/or close a refrigerator door, or the like) with a retail product. The one or more microsensors 102 may be configured to measure the one or more signals indicative of one or more near-product engagements continuously (e.g., measure the one or more signals at regular intervals) or intermittently (e.g., measure signals only when a customer interaction occurs). The one or more microsensors 102 may be disposed within a retail environment, including, without limitation, on shelving units, in refrigerators, in freezers, on product shippers and displays, or the like.

As used herein, the term "retail environment 103" may refer to any portion of a retail store, including, without limitation, the store itself, aisles, shelves, display areas, display hardware, products, customers, employees, patrons, equipment, or the like.

As used herein, the term "near-product engagement" may include, but is not limited to, any interaction that may occur within a retail environment between a customer and one or more portions of the retail environment. For example, a near-product engagement may include an individual (e.g., customer, patron, invitee, employee, or the like) physically interacting with a product within the retail environment, such as through picking up the product off of a shelf, returning the product to a shelf, moving the product on the shelf, looking at the product on a shelf, or the like. By way of another example, a near-product engagement may include one or more portions of the system 100 (e.g., the one or more microsensors, the media device 120, or the like) interacting with an individual or other portion of the retail environment. Specifically, a near-product engagement may include one or more aural, visual, or tactile interactions (e.g., such as through lights, sounds, video displays, mechanical devices, or the like) between one or more portions of the retail environment and an individual within the retail environment. The term "near-product engagement" may include a result of the one or more processors 110 causing the media device 120 to activate one or more lights, sounds, video displays, or the like (as described in greater detail herein). It is further contemplated that the term "near-product engagement" may refer to a series of engagements between one or more portions of the retail environment and one or more individuals. For example, the system 100 may be configured such that a series of near-product engagements are determined as part of a feedforward and/or feedback loops. For example, upon determination of a first near-product engagement, one or more portions of the system 100 (e.g., the one or more microsensors 102) may simultaneously or nearly-simultaneously measure one or more signals indicative of the first near-product engagement and/or one or more signals indicative of a second near-product engagement, where the second near-product engagement that may occur upon interaction between the media device 120 and one or more other portions of the retail environment (e.g., a customer).

The one or more microsensors 102 may include, but are not limited to, passive infrared sensors, light sensors, vibration sensors, temperature sensors, humidity sensors, LIDAR sensors, cameras, accelerometers, orientation sensors (e.g., gyroscopes), ultrasonic radiation sensors, microwave radiation sensors, weight sensors (e.g., load-sending cells, force-sensitive resistors, capacitive weight sensors), magnetic sensors (e.g., Hall-effect sensors), potentiometric sensors, electrical and/or piezoelectrical switches, or the like.

In one embodiment, the hubs 104 comprise a first hub 104a, a second hub 104b, and an Nth hub 104n. It is noted herein that reference may be made particularly to the first hub 104a, and that the "hub 104a" may be generally referred to as "hub 104" Furthermore, it is noted that while much of the present description refers to specific hubs 104 (e.g., 104a, 104b, etc.), embodiments of the present disclosure may be regarded as referring to one or more hub 104, including the first hub 104a, the second hub 104b, and the Nth hub 104n.

The one or more hubs 104 may be communicatively coupled to a network 106. In this regard, the one or more hubs 104 may be configured to transceive (e.g., transmit and/or receive) signals from the network 106. The one or more hubs 104 may be communicatively coupled to the one or more microsensors 102, and may be configured to receive one or more signals indicative of one or more near-product engagements within the retail environment 103. For example, the one or more hubs 104 may be configured to receive one or more signals from the one or more microsensors 102 continuously (e.g., at regular intervals) or intermittently (e.g., only when a customer interaction occurs). The one or more hubs 104 may be configured to transmit the one or more signals indicative of one or more near-product engagements to the network 106.

The one or more hubs 104 may include a power source (e.g., an alternating or direct current source, a power source provided over universal serial bus (USB)). In some embodiments, the one or more hubs 104 may derive power from existing powered components within the retail environment 103 (e.g., lighting components disposed on a shelf). The one or more hubs 104 may include a solar power source.

The one or more hubs 104 may be communicatively coupled to the one or more microsensors 102 and/or one or more other hubs 104 via one or more wireline-based interface devices (e.g., DSL-based interconnection, cable-based connection, T9-based interconnection, and the like), or one or more wireless-based interface devices employing GSM, GPRS, CDMA, EV-DO, EDGE, WiMAX, 3G, 4G, LTE, 5G, 6G, ISM, Wi-Fi protocols, RF, and the like. The one or more hubs 104 may be configured to operate using one or more communication protocols, including, without limitation, Bluetooth, Zigbee, LoRa, or the like. The one or more hubs 104 may be configured as network gateways, wherein the one or more hubs 104 transceive data between the network 106 and one or more other components of the system 100, including, without limitation, the one or more microsensors 102. In this regard, the one or more hubs 104 may include one or more network interface devices suitable for interacting with the network 106. The network interface devices may include any network interface device known in the art to be suitable for the purposes contemplated by the present disclosure, including, without limitation one or more wireline-based interface devices (e.g., DSL-based interconnection, cable-based connection, T9-based interconnection, or the like), or one or more wireless-based interface devices employing GSM, GPRS, CDMA, EV-DO, EDGE, WiMAX, 3G, 4G, LTE, 5G, 6G, Wi-Fi protocols, RF, or the like.

The one or more hubs 104 may be communicatively coupled to a server 108 via the network 106. In this regard, the server 108 may include any network interface device known in the art to be suitable for the purposes contemplated by the present disclosure, including, without limitation one or more wireline-based interface devices (e.g., DSL-based interconnection, cable-based connection, T9-based interconnection, or the like), or one or more wireless-based interface devices employing GSM, GPRS, CDMA, EV-DO, EDGE, WiMAX, 3G, 4G, LTE, 5G, 6G, Wi-Fi protocols, RF, or the like. The The server 108 may include one or more processors 110 configured to execute one or more sets of program instructions stored in one or more memory units 112. It is noted that, the embodiments of the present disclosure are not limited to the one or more processors 110 and the one or more memory units 112 being housed in a remote server 108. For example, the one or more processors 110 and/or the one or more memory units 112 may be configured to process data locally at the system level (e.g., within the retail environment, or in close proximity to other components of the system 100). In another embodiment, the one or more processors 110 may be configured to operate in a distributed topology (e.g., an edge computing topology). For example, the one or more processors 110 may process data in conjunction with each other, whereby the processing load of the system is distributed across the multiple processors 110. It is specifically contemplated that the one or more processors 110 may be disposed within any component of the system 100, including, without limitation, the one or more microsensors 102, the one or more hubs 104, the server 108, the user interface 114, and/or the media device 120.

The one or more processors 110 may be configured to determine one or more near-product engagements based on the one or more signals indicative of one or more near-product engagements. For example, the one or more processors 110 may be configured to identify a near-product engagement (e.g., customer interaction) based on one or more signals measured by the one or more microsensors 102. The one or more processors 110 may be configured to determine one or more near-product engagements by comparing a measured signal (e.g., acceleration, proximity, intensity, temperature, etc.) against a pre-set threshold stored in the one or more memory units 112 or provided by a user via the user interface 114. In this way, the one or more processors 110 may be configured to characterize signals measured by the one or more microsensors as being indicative of one or more near-product engagements (e.g., as falling within the pre-set threshold) or as not being indicative of one or more near-product engagements (e.g., as falling outside of the pre-set threshold).

In some embodiments, the one or more processors 110 may be configured to determine one or more near-product engagements continuously (e.g., at regular intervals) or intermittently (e.g., only when a customer interaction or other near-product engagement occurs). In this regard, the one or more processors 110 may be configured to continuously poll one or more other portions of the system 100, including, without limitation, the one or more microsensors 102 and/or the one or more hubs 104 for measured signals indicative of one or more near-product engagements. In other embodiments, the one or more processors 110 may be configured to interrogate one or more portions of the system 100 including, without limitation, the one or more microsensors 102 and/or the one or more hubs 104 for measured signals indicative of one or more near-product engagements only at pre-programmed times provided by a user.

In some embodiments, the one or more processors 110 may be configured to produce one or more outputs (e.g., alerts) based on the determined one or more near-product engagements. For example, the one or more processors 110 may be configured to provide the one or more outputs via the user interface 114. By way of another example, the one or more processors 110 may be configured to provide alerts only when one or more pre-programmed conditions exist (e.g., product movement, temperature variances, inventory depletion or reduction, etc.). The one or more processors 110 may be configured to compare a measured signal and/or a determined near-product engagement based on the measured signal to a pre-programmed threshold in order to determine whether the determined near-product engagement constitutes a false positive (e.g., a near-product engagement that is not the result of a customer interaction with a product). For example, the one or more processors 110 may be configured to filter false positive engagements resulting from employees stocking, re-aligning, or re-organizing products within the retail environment 103.

In some embodiments, the one or more processors 110 may be configured to determine one or more near-product engagements via one or more machine learning processes. For example, the one or more processors 110 may develop a machine learning analyzer using data collected during one or more prior, known near-product engagements. Upon development of a machine learning analyzer, the one or more processors 110 may apply the machine learning analyzer to the one or more signals indicative of one or more near-product engagements. It is noted that the embodiments of the present disclosure are not limited to the determination of near-product engagements via machine learning processes. For example, as previously described, the one or more processors 110 may implement a threshold, wherein the one or more processors 110 may determine that one or more signals indicative of a near-product engagement exceed the threshold, and may execute some pre-determined instruction in response thereto.

The one or more processors 110 may be configured to determine one product data based on the one or more near-product engagements. For example, the one or more processors 110 may be configured to compare a first quantity of near-product engagements to a second quantity of near-product engagements, where the first quantity of near-product engagement may result from various factors or conditions that are not present with respect to the second quantity of near-product engagements. In this way, the one or more processors 110 may be configured to determine more efficient product placement and/or arrangement within the retail environment, relative engagement rate as between two or more products, correlations between engagements and product purchase data stored in memory or provided by a user, or the like. The one or more processors 110 may be configured to track product inventory within the retail environment 103 by comparing a number of engagements to a known quantity of product within the retail environment 103.

It is specifically contemplated that the system 100 may be configured to aggregate product data (e.g., data related to one or more near-product engagements and/or one or more anticipated near-product engagements or spatial relationship data (each of which is described in greater detail herein)), such as via the one or more memory units 112, over a period of time. In this way, the one or more processors 110 may be configured to determine one or more trends (e.g., customer purchasing trends, inventory trends, pricing trends, trends in customer behavior, or the like) based on aggregated product data. The one or more trends determined based on aggregated product data may provide valuable information to retail operators. For example, the aggregated product data may provide information related to various business activities, including, without limitation, inventory purchasing, inventory placement, product pricing, customer purchasing habits, employee supervision, or the like. By way of another example, the one or more processors 110 may use the one or more trends determined based on aggregated product data to generate one or more baseline models against which future aggregations of data or single data points may be compared. In this way, the one or more trends may permit retail operators to assess certain aspects of operations across a period of time (e.g., sales, revenue, inventory, seasonal purchasing decisions, or the like).

In some embodiments, the one or more processors 110 may be configured to execute a set of program instructions configured to cause the media device 120 to interact with one or more portions of the retail environment 103. For example, the one or more processors 110 may be configured to cause the media device 120 to activate one or more lights, sounds, video displays, or the like. By way of another example, the one or more processors 110 may be configured to cause the media device 120 to interact with one or more portions of the retail environment 103 upon determination of a near-product engagement. In this way, the one or more processors 110 may be configured to cause the media device 120 to provide to a customer information regarding one or more products within the retail environment 103.

The media device 120 may be communicatively coupled to one or more portions of the system 100, including, without limitation, the one or more processors 110 via the network 106. The media device 120 may include, but is not limited to, one or more desktops, laptops, tablets, one or more speakers, lights, and the like. In another embodiment, the media device 120 includes a display used to display data of the system 100 to a user.

It is noted that the one or more user interfaces 114 may include, but is not limited to, one or more desktops, tablets, smartphones, smart watches, or the like. In one embodiment, a user may use the user interface 114 in order to view spatial relationship data stored in memory 112. For example, the manager of a retail store may use her smartphone (e.g., user interface 114) in order to review all the spatial relationship data collected by system 100 within the retail store over a selected period of time. In some embodiments, the user interface 114 includes a display used to display data of the system 100 to a user. The display of the user interface 114 may include any display known in the art. For example, the display may include, but is not limited to, a liquid crystal display (LCD), an organic light-emitting diode (OLED) based display, or a CRT display. Those skilled in the art should recognize that any display device capable of integration with a user interface 114 is suitable for implementation in embodiments of the present disclosure. In another embodiment, a user may input selections and/or instructions responsive to data displayed to the user via the user interface 114. In this regard, the user interface 114 may be configured to receive input selections and/or instructions from a user through a configuration/calibration app, wherein the input selections may alter one or more characteristics of system 100. Input instructions may include, but are not limited to, calibration and sensitivity instructions for the one or more microsensors 102, the one or more sensor units 109, geofencing boundaries, store operating hours, and the like.

Figure 2A:
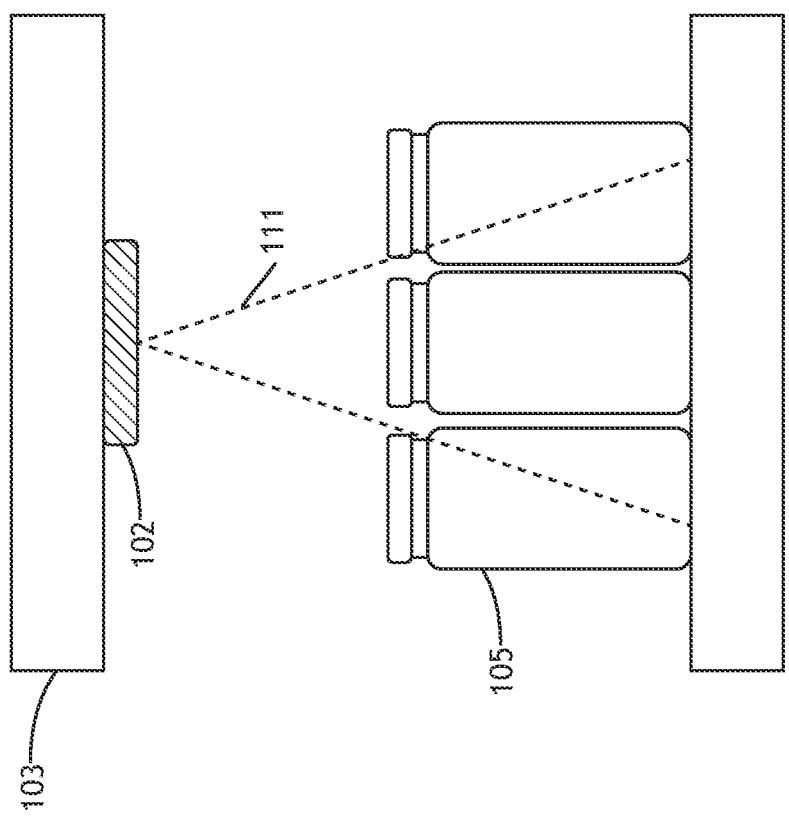
FIG. 2A illustrates a system for identifying product engagements, in accordance with one or more embodiments of the present disclosure.
Figure 2B:
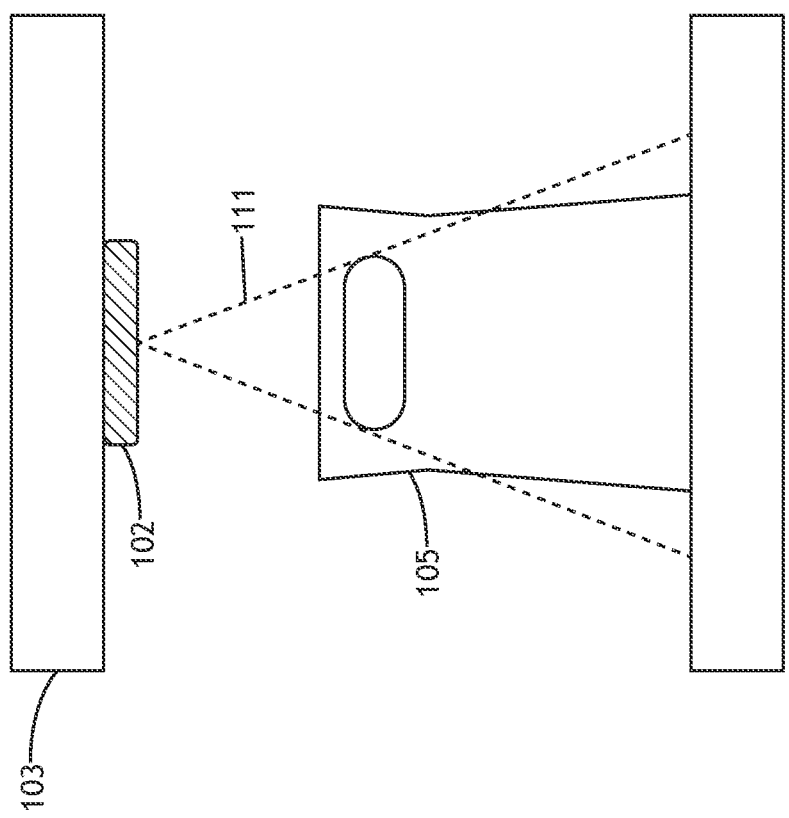
FIG. 2B illustrates a system for identifying product engagements, in accordance with one or more embodiments of the present disclosure.

In some embodiments, as illustrated in FIGS. 2A and 2B, the one or more microsensors 102 may be configured to generate one or more waves 111 to form a curtain within the retail environment 103. For example, the one or more microsensors 102 may generate a wave 111 across a plane near a shelf within the retail environment 103. The wave 111 may be generated such that it forms a curtain across the plane near the shelf. The one or more microsensors 102 may be configured to measure signals indicative of disruption of and/or interference with the wave 111, as may be the result of a customer interacting with a product 105 (e.g., lifting the product 105, replacing the product 105, or the like). The wave 111 may include any radiant wave, including, without limitation, an infrared wave.

Figure 2C:
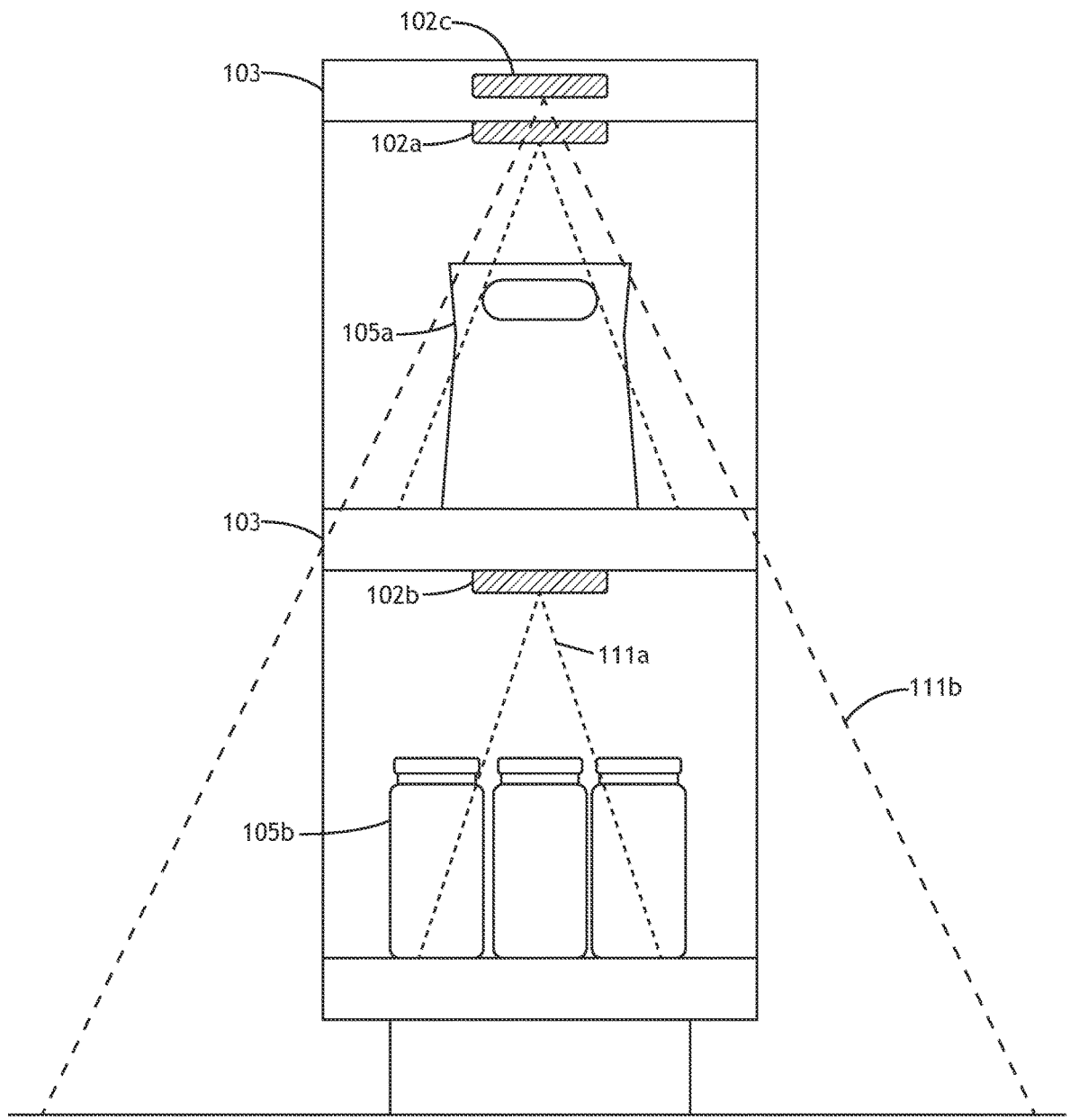
FIG. 2C illustrates a system for identifying product engagements, in accordance with one or more embodiments of the present disclosure.

The one or more processors 110 may be configured to determine one or more near-product engagements and/or determine that a customer is within close proximity to the product 105 based on the one or more signals indicative of disruption and/or interference with the wave 111. In this regard, the system 100 may be configured to determine one or more near-product engagements and one or more anticipated near-product engagements based on a determination that a customer is within close proximity to the product 105. For example, as shown in FIG. 2C, the system 100 may include a first microsensor 102a configured to generate a first wave 111a to measure signals indicative of one or more near-product engagements with respect to a first product 105a. The system 100 may further include a second microsensor 102b configured to generate a second wave 111b to measure signals indicative of one or more near-product engagements with respect to a second product 105. The system 100 may further include a third microsensor 102c configured to generate a third wave 111c to measure signals indicative of customer proximity within the retail environment, and, specifically, within close proximity to the portion of the retail environment 103 housing the first product 105a and the second product 105b. For example, as shown in FIG. 2C, the third microsensor 102c may be configured to generate the third wave 111c such that the third wave 111c extends across a plane within one or more portions of the retail environment 103, and wherein the third wave 111c may be disrupted and/or interfered with by customer behavior (e.g., a customer's foot falling across the wave).

It is specifically contemplated that the embodiments of the present disclosure are not limited to the one or more microsensors 102 measuring signals indicative of disruption of and/or interference with the wave 111. For example, in some cases, such as where the wave 111 comprises an infrared wave, the one or more microsensors 102 may be configured to measure signals indicative of temperature, where the one or more processors 110 may determine that a customer is in proximity to a product based on the presence of an object having human body temperature within the retail environment 103.

Figure 3:
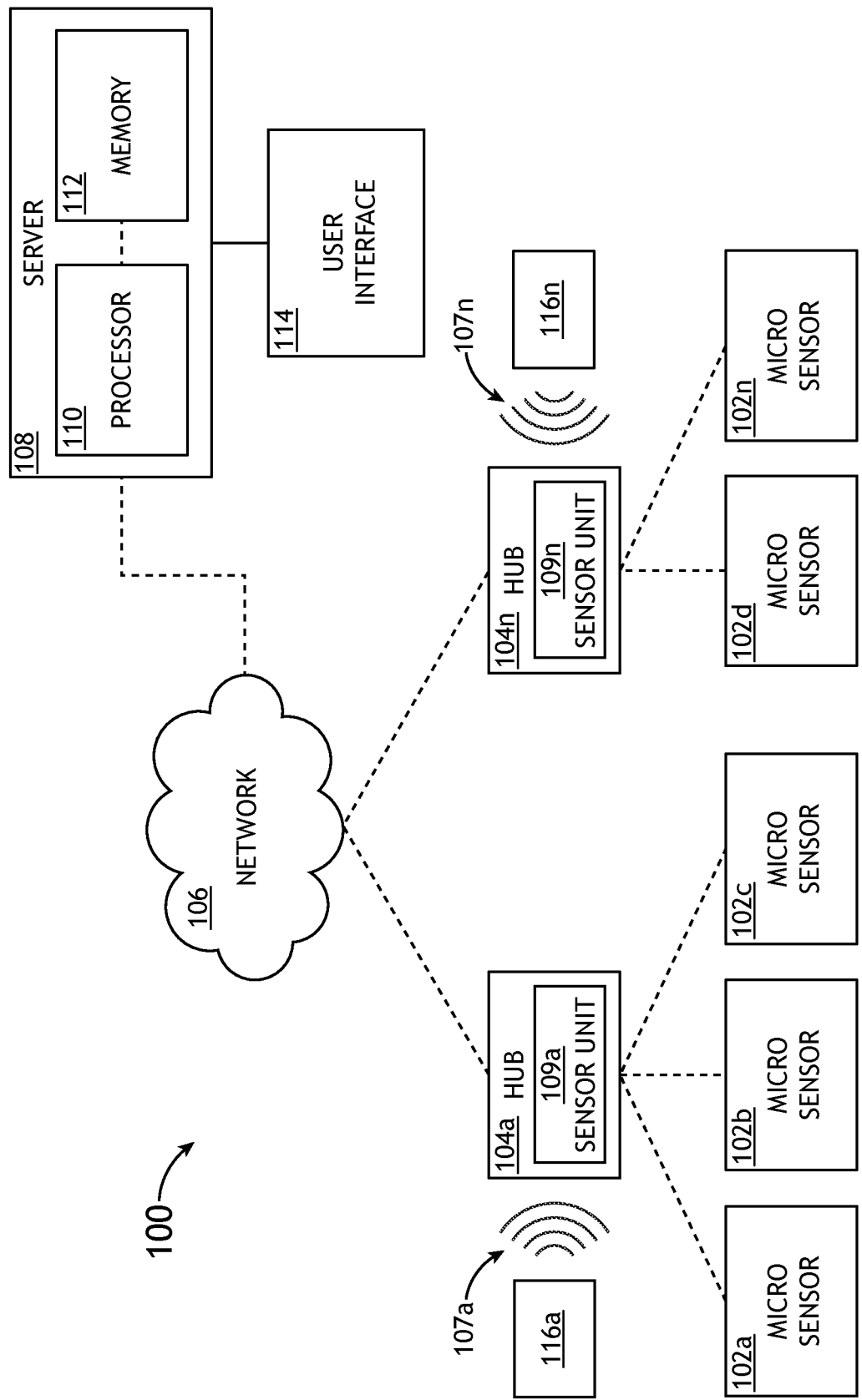
FIG. 3 illustrates a simplified block diagram of a system for identifying product engagements, in accordance with one or more embodiments of the present disclosure.

In some embodiments, as shown in FIG. 3, the system 100 may be configured to determine one or more near-product engagements and/or one or more anticipated near-product engagements based on one or more wireless signals 107 transmitted from one or more transmitting electronic devices 116. For example, the one or more hubs 104 may include one or more sensor units 109 configured to receive the one or more wireless signals 107 from the one or more transmitting electronic devices 116. As depicted in FIG. 3, the system 100 may include a first sensor unit 109a and an Nth sensor unit 109n, a first transmitting electronic device 116a, and an Nth transmitting electronic device 116n. The one or more transmitting electronic devices 116 may include any electronic device carried by a patron of the retail environment 103 that is capable of transmitting wireless signals, including, without limitation, personal electronic devices (e.g., cell phones, smartphones, tablets, smart watches, and the like), desktop computers, smart speakers, smart lightbulbs, and the like.

It is noted herein that reference may be made particularly to the first sensor unit 109a, and that the "first sensor unit 109a" may be generally referred to as "sensor unit 109". Furthermore, it is noted that while much of the present description refers to specific sensor units 109 (e.g., 109a), embodiments of the present disclosure may be regarded as referring to one or more sensor units 109, including the first sensor unit 109a and the Nth sensor unit 109n. Similarly, the "first transmitting electronic device 116a" may be generally referred to as "transmitting electronic device 116". Furthermore, it is noted that while much of the present description refers to specific transmitting electronic devices (e.g., 116a), embodiments of the present disclosure may be regarded as referring to one or more transmitting electronic devices 116, including the first transmitting electronic device 116a and the Nth transmitting electronic device 116n.

It is noted that the one or more wireless signals 107 may include any wireless signals known in the art including, but not limited to, WiFi signals, Bluetooth signals, 3G signals, 4G signals, 4G LTE signals, and the like. The one or more sensor units 109 may be configured to conduct passive wireless "signal sniffing" (e.g., signal monitoring). It is noted that the signal sniffing (e.g., signal monitoring) may be done using the "monitor mode" of the one or more sensor units 109. In this regard, the one or more sensor units 109 may passively receive wireless signals 107 (e.g., WiFi signals, and the like) from one or more transmitting electronic devices 116.

While the present description discusses the one or more sensor units 109 conducting passive wireless signal monitoring, this is not to be regarded as a limitation of the present disclosure. It is noted that the one or more sensor units 109 of the present disclosure may conduct signal monitoring using any method known in the art including, but not limited to, passive and active signal monitoring. For example, the one or more sensor units 109 may be configured to transmit signals (not shown) in order to "ping" transmitting electronic devices 116. In this regard.

In one embodiment, a transmitting electronic device 116 may transmit wireless signals 107. The one or more processors 110 may be configured to determine a spatial relationship between the transmitting electronic device 116 and the respective sensor units 109. For example, the one or more processors 110 may be configured to determine a spatial relationship between the transmitting electronic device 116 and the respective sensor units 109 based on RSSI values of the received wireless signals 107. By way of another example, first sensor unit 109a may receive wireless signals 107a with a first RSSI value and determine a first spatial relationship between the transmitting electronic device 116 and the first sensor unit 109a. The first spatial relationship may be represented as the distance between the transmitting electronic device 116 and the first sensor unit 109a. Similarly, a second sensor unit 109b and third sensor unit 109c may receive wireless signals 107b and 107c with a first and second RSSI values, respectively. The second sensor unit 109b and third sensor unit 109c may then determine a second spatial relationship and a third spatial relationship, respectively. In this regard, first spatial relationship, second spatial relationship, and third spatial relationship may be used to determine the position of the transmitting electronic device 116 to a single point within the retail environment 103.

It is noted herein that although only three sensor units 109 may be required to triangulate the position of one or more transmitting electronic devices 116, additional sensor units 109n may be utilized in system 100 in order to determine additional spatial relationships and to more accurately determine the position of one or more transmitting electronic devices 116. Additional spatial relationships may allow the system 100 to more accurately determine the location of one or more transmitting electronic devices by allowing the one or more processors to disregard inaccurate spatial relationships, average determined positions of one or more transmitting electronic devices 116, and the like. In this regard, it is noted that additional sensor units 109 (and additional spatial relationships) may result in more accurate transmitting electronic device 116 position determinations.

It is noted that determining spatial relationships between a sensor unit 109 and one or more transmitting electronic devices 116 may provide valuable information in a variety of different settings. For example, as noted previously herein, three or more sensor units 109 may be placed in a retail environment 103 and may be configured to determine the position of one or more customers' smartphones (e.g., transmitting electronic devices 116). Because the position of one or more customers' smartphones is generally indicative of the one or more customers' position, the position of the one or more customers' smartphones may be indicative of a the one or more customers' positions within the retail environment. In this way, the position of the one or more customers' smartphones may be used to determine one or more aspects of customer behavior, including, without limitation, near-product engagements, anticipated near-product engagements, purchasing habits, and the like. It is noted that the system 100 of the present disclosure, as depicted in FIG. 3, may provide the managers and/or owners (e.g., users) of the retail environment 103 with many valuable pieces of information. For example, the system 100 may be used to determine how many consumers entered the retail store over a given period of time. By way of another example, system 100 may allow a user to identify congested traffic areas within the retail environment 103. This information may then be used to adjust the layout of the retail store in order to provide a more efficient, consumer-friendly space. It is further noted that the system 100 may allow a user to determine which products throughout the store are viewed most/least frequently (e.g., based on near-product engagements, anticipated near-product engagements, spatial relationship data, or the like). Furthermore, it is noted that comparing near-product engagement and stored spatial relationship data to the types and number of products sold may provide the retailer with additional information, including, but not limited to, the relative frequency at which products are viewed compared to the frequency at which those products are purchased. Information regarding the frequency at which products are used compared to the frequency at which those products are purchased may allow a user to adjust the price of products and adjust inventory purchasing decisions.

In some embodiments, near-product engagement and spatial relationship data may be time-stamped. In this way, the system 100 may allow a user to determine the "dwell time" of each consumer within the area being monitored. Dwell time may be defined as the time span between when a near-product engagement, an anticipated near-product engagement, and/or a spatial relationship was first detected and when the near-product engagement, an anticipated near-product engagement, and/or a spatial relationship ended. It is noted herein that cumulative data regarding the dwell time of consumers may provide valuable information to a wide array of users, including owners of retail stores, restaurants, bars, malls, and the like.

While much of the foregoing description discusses the system of the present disclosure used in a retail environment, this is not to be regarded as a limitation of the present disclosure. It is noted that the system of the present disclosure may provide valuable spatial relationship data in a wide array of environments. For example, the system of the present disclosure may be utilized in any environment where the analysis of traffic patterns is desired. For instance, the system of the present disclosure may be used throughout a mall in order to identity traffic patterns. Data regarding traffic patterns in malls may be used to identify the most highly traveled areas of the mall, and may thus be used to identify the most valuable advertising space within the mall. By way of another example, the system of the present disclosure may be used in a park to determine where additional paved paths may be required, or where existing paved paths may be removed.

In some embodiments, the one or more processors 110 are configured to carry out one or more filtering functions on the received spatial relationship data. The one or more filtering functions may include, but are not limited to, filtering out spatial relationship data regarding transmitting electronic devices 116 which are not associated with a consumer. For example, continuing with the retail store example, smartphones (e.g., transmitting electronic devices 116) of employees, electronic devices for sale, desktop computers used by the retailer in the ordinary course of business, smart speakers, smart lightbulbs, and the like, may all transmit wireless signals 107 which lead to the generation of spatial relationship data. In this example, it may be desirable to filter out all the spatial relationship data associated with these transmitting electronic devices 116 such that the only spatial relationship data to be analyzed is that which is likely to be associated with consumers. In this regard, the one or more processors 110 may be configured to carry out one or more filtering functions to filter out all spatial relationship data except the spatial relationship data associated with consumers' PEDs including, but not limited to, consumers' cell phones, consumers' smartphones, consumers' smart watches, consumers' tablets, and the like.

By way of an example, one or more processors 110 may be configured to perform one or more filtering functions on the received spatial relationship data based on the manufacturer of the transmitting electronic devices 116. For instance, Sonos is a manufacturer of smart speakers which does not presently manufacture smart phones. As such, it is unlikely a product manufactured by Sonos will be associated with a consumer. In this example, one or more processors 110 may receive wireless signals 107 from one or more Sonos smart speakers. The one or more processors 110 may be further configured to receive operating system data (e.g., time-to-live (TTL) data) from the one or more Sonos smart speakers (e.g., transmitting electronic devices 116), determine the manufacturer to be Sonos, and filter out all the spatial relationship data associated with Sonos-manufactured transmitting electronic devices 116.

By way of another example, the one or more processors 110 may be configured to perform one or more filtering functions on the received spatial relationship data based on the repeated spatial relationship patterns of one or more transmitting electronic devices 116. For instance, if a spatial relationship is determined between one or more sensor units 109 and a transmitting electronic device 116 every Monday through Friday between the hours of 8:00 am and 5:00 pm, the one or more processors 110 may be configured to mark the transmitting electronic device 116 as one associated with an employee. As such, the one or more processors 110 may be configured to filter out all the spatial relationship data associated with that transmitting electronic device 116. It is noted that filtering functions based on repeated spatial relationship patterns may be further refined, and are not limited to the examples disclosed herein. For instance, if the system 100 were implemented in a retail store, a user may be able to input the store operating hours into the one or more user interfaces 114 (which may include one or more calibration applications stored in memory 112). In this regard, the one or more processors 110 may be configured to associate repeated spatial relationship patterns within the store operating hours as spatial relationship data associated with daily employees (e.g., employees' transmitting electronic devices 116). Conversely, the one or more processors 110 may be configured to associate repeated spatial relationship patterns outside of the store operating hours as spatial relationship data associated with night shift or clean-up crew employees.

By way of another example, the one or more processors 110 may be configured to perform one or more filtering functions on the received spatial relationship data based on the movement (or lack thereof) of one or more transmitting electronic devices 116. The movement of transmitting electronic devices 116 may be determined by the change in distances over time between a transmitting electronic device 116 and one or sensor units 109. Changes in distance over time may be determined by changing RSSI values over time. In some instances, it may be the case that transmitting electronic devices 116 which exhibit little to no movement (e.g., substantially constant RSSI values over time) are unlikely to be associated with consumers. For example, electronic devices on sale, smart speakers, desktop computers, and other non-mobile electronic devices may transmit wireless signals 107 and generate spatial relationship data which is not associated with consumers. In this regard, the one or more processors 110 may be configured to filter out spatial relationship data associated with stationary transmitting electronic devices 116 that are unlikely to be associated with consumers.

By way of another example, one or more processors 110 may be configured to perform one or more filtering functions on the received spatial relationship data based on RSSI values of the wireless signals 107 received. For instance, a user may input a geofenced border in the configuration/calibration app signifying the area to be monitored. Wireless signals 107 with RSSI values under a specified value may indicate that the transmitting electronic device 116 is outside the area being monitored (e.g., outside of the retail store). In this example, the one or more processors 110 may utilize RSSI values to filter out the spatial relationship data associated with transmitting electronic devices 116 which are outside of a pre-defined geofenced boundary.

In another embodiment, the system 100 is configured to store near-product engagement, anticipated near-product engagement, and spatial relationship data in memory 112. The one or more processors 110 may be configured to store all the near-product engagement, anticipated near-product engagement, and/or spatial relationship data collected by the system 100. Alternatively, the one or more processors 110 may be configured to the near-product engagement, anticipated near-product engagement, and/or spatial relationship data only after various filtering functions have been performed. It is specifically contemplated that the filtering functions described herein are not limited to spatial relationship data. For example, the one or more processors 110 may be configured to perform one or more filtering functions on near-product engagement and anticipated near-product engagement data. Furthermore, near-product engagement, anticipated near-product engagement, and/or spatial relationship data stored in memory 112 in order to manually apply filtering functions for the one or more processors 110 to carry out. For example, the user interface 114 may be configured to receive input selections which cause the one or more processors 110 to filter out all spatial relationship data associated with an employee's smartphone (e.g., transmitting electronic device) and/or all near-product engagement data associated with an employee restocking a shelf. It is specifically contemplated that the system 100 may be configured to aggregate product data (e.g., data related to one or more near-product engagements and/or one or more anticipated near-product engagements or spatial relationship data), in one or more memory units 112, over a period of time. In this way, the one or more processors 110 may be configured to determine one or more trends (e.g., customer purchasing trends, inventory trends, pricing trends, trends in customer behavior, or the like) based on aggregated product data. The one or more trends determined based on aggregated product data may provide valuable information to retail operators. For example, the aggregated product data may provide information related to various business activities, including, without limitation, inventory purchasing, inventory placement, product pricing, customer purchasing habits, employee supervision, or the like. By way of another example, the one or more processors 110 may use the one or more trends determined based on aggregated product data to generate one or more baseline models against which future aggregations of data or single data points may be compared. In this way, the one or more trends may permit retail operators to assess certain aspects of operations across a period of time (e.g., sales, revenue, inventory, seasonal purchasing decisions, or the like).

It is noted that the one or more processors 110 may include any one or more processing elements known in the art. In this regard, the one or more processors 110 may include any microprocessor-type device configured to execute software algorithms and/or instructions. In one embodiment, the one or more processors 110 may consist of a desktop computer, mainframe computer system, workstation, image computer, parallel processor, or other computer system (e.g., networked computer) configured to execute a program configured to operate the system 100, as described throughout the present disclosure. It should be recognized that the steps described throughout the present disclosure may be carried out by a single computer system or, alternatively, multiple computer systems. In general, the term "processor" may be broadly defined to encompass any device having one or more processing elements, which execute program instructions from memory 112. Moreover, different subsystems of the system 100 (e.g., microsensors 102, sensor units 109, server 108, user interface 114, media device 120) may include processor or logic elements suitable for carrying out at least a portion of the steps described throughout the present disclosure. Therefore, the above description should not be interpreted as a limitation on the present disclosure but merely an illustration.

The one or more memory units 112 may include any storage medium known in the art suitable for storing program instructions executable by the associated one or more processors 110 and the data received from the one or more microsensors 102, the one or more hubs 104 and/or the one or more sensor units 109. For example, the memory 112 may include a non-transitory memory medium. For instance, the memory 112 may include, but is not limited to, a read-only memory, a random-access memory, a magnetic or optical memory device (e.g., disk), a magnetic tape, a solid-state drive and the like. In another embodiment, the memory 112 is configured to store near-product engagement, anticipated near-product engagement, and spatial relationship data received from one or more components of the system 100. The one or more memory units 112 may include remote memory (e.g., server or cloud-based memory), accessible through a network (e.g., internet, intranet and the like). In another embodiment, the memory 112 maintains program instructions for causing the one or more processors 110 to carry out the various steps described through the present disclosure.

Figure 4:
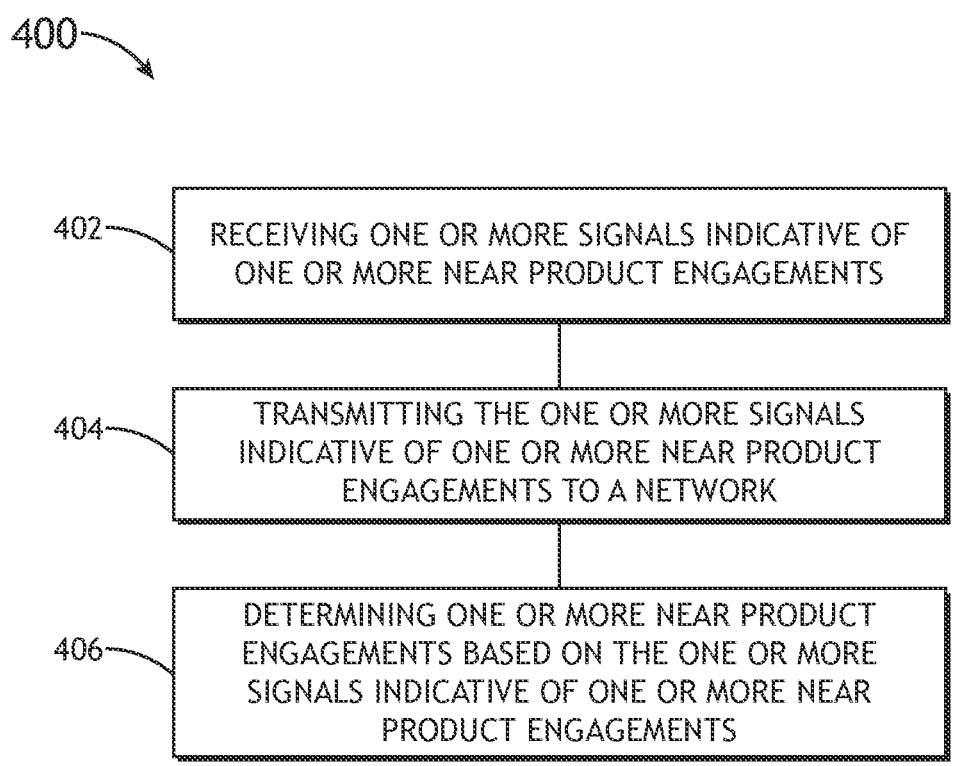
FIG. 4 illustrates process flow diagram for a method of determining spatial relationships, in accordance with one or more embodiments of the present disclosure.

FIG. 4 illustrates a process flow diagram depicting a method 400 for identifying one or more product engagements, in accordance with one or more embodiments of the present disclosure.

In step 402, one or more signals indicative of one or more near-product engagements are received. For example, the one or more microsensors 102 may measure one or more signals indicative of one or more near-product engagements and provide the signals to the one or more hubs 104. It is contemplated that the one or more signals may be indicative of near-product engagements or one or more anticipated near-product engagements.

In step 404, the one or more signals indicative of one or more near-product engagements are transmitted to a network. For example, the one or more hubs 104 may transmit the one or more signals to the network 106 for storage and/or processing.

In step 406, one or more near-product engagements are determined based on the one or more signals indicative of one or more near-product engagements. For example, the one or more processors 110 may determine the one or more near-product engagements based on the one or more signals indicative of one or more near-product engagements. It is contemplated that the one or more processors 110 may be configured to determine one or more near-product engagements and/or one or more anticipated near-product engagements based on the one or more signals.

Figure 5:
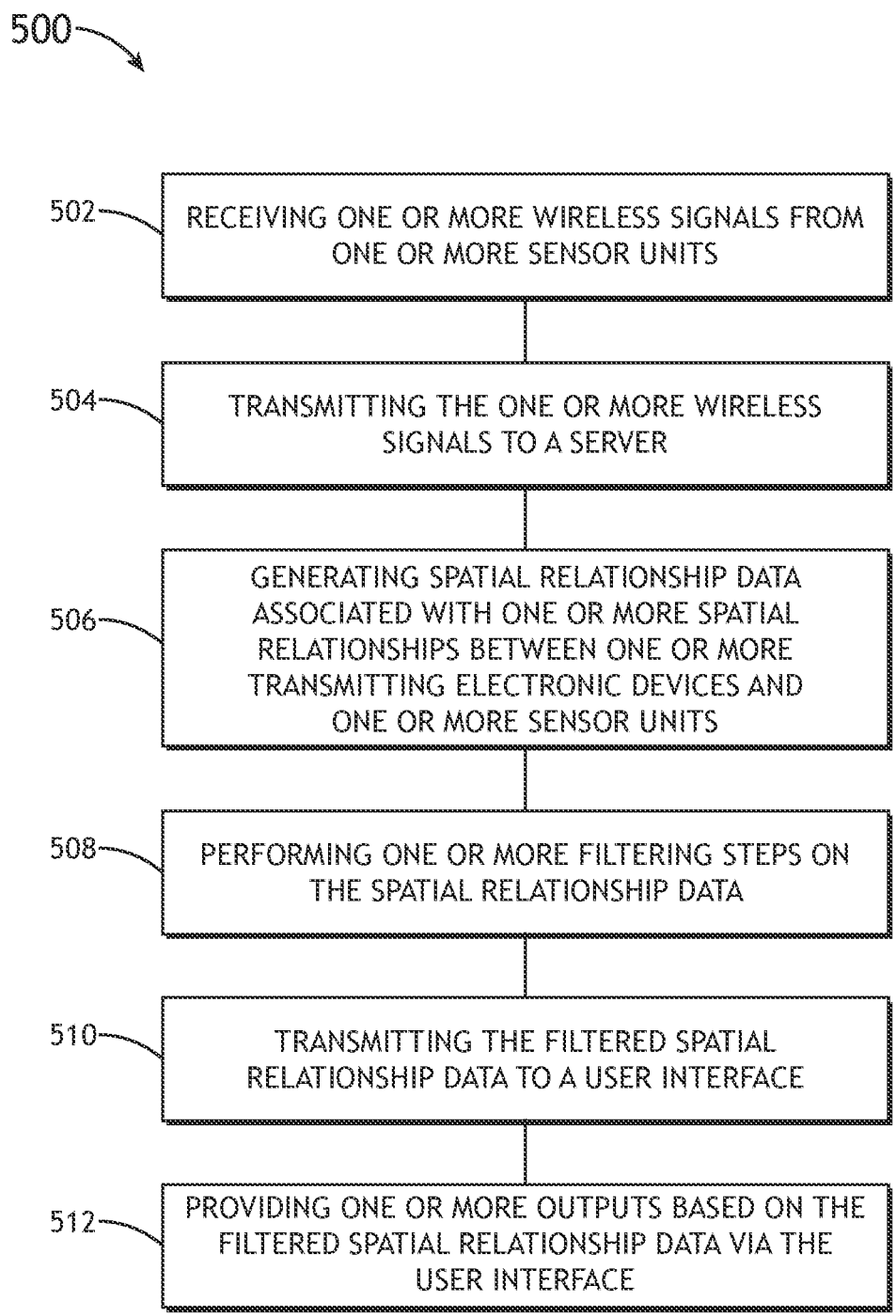
FIG. 5 illustrates a flow chart of a method for identifying product engagements, in accordance with one or more embodiments of the present disclosure.

FIG. 5 illustrates a process flow diagram depicting a method 500 for determining one or more spatial relationships, in accordance with one or more embodiments of the present disclosure.

In step 502, one or more wireless signals transmitted by one or more transmitting electronic devices are received by one or more sensor units. For example, a retail environment may be equipped with three or more sensor units 109, wherein the sensor units may receive wireless signals from multiple smartphones of consumers (e.g., transmitting electronic devices).

In step 504, the one or more wireless signals are transmitted to a server. The one or more sensor units may be communicatively coupled to the server via a network, and may transmit the wireless signals via a network antenna. In this regard, the one or more sensor units may include a network interface. Network interface may include any network interface device suitable for interfacing with the network.

In step 506, spatial relationship data associated with one or more spatial relationships between one or more transmitting electronic devices and one or more sensor units is generated. In one embodiment, spatial relationships may be identified by using RSSI values. It is noted that RSSI values may be inversely related to distance. In this regard, low RSSI values may be associated with close spatial relationships (e.g., close distances), and high RSSI values may be associated with larger spatial relationships (e.g., larger distances).

In step 508, one or more filtering steps are performed on the spatial relationship data. In one embodiment, one or more processors of the server may perform one or more filtering functions on the spatial relationship data. Filtering may be based on, but is not limited to being based on, manufacturer, movement, position relative to geofenced boundaries, and the like.

In step 510, the filtered spatial relationship data is transmitted to a user interface. In one embodiment, the server is communicatively coupled to the user interface via a network.

In step 512, the filtered spatial relationship data is displayed on a display of the user interface (e.g., as one or more outputs). In one embodiment, a user may be able to input commands via the user interface to adjust one or more characteristics of the displayed spatial relationship data. For example, a user may input filtering commands to further filter the displayed relationship data.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like Furthermore, the results may be stored "permanently," "semi-permanently," temporarily, or for some period of time. For example, the memory may be random access memory (RAM), and the results may not necessarily persist indefinitely in the memory.

It is further contemplated that each of the embodiments of the methods described above may include any other step(s) of any other method(s) described herein. In addition, each of the embodiments of the methods described above may be performed by any of the systems described herein.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

The one or more components of the present disclosure may be communicatively coupled to the various other components of present disclosure in any manner known in the art. For example, processors may be communicatively coupled to each other and other components via a wireline (e.g., copper wire, fiber optic cable, and the like) or wireless connection (e.g., RF coupling, IR coupling, data network communication (e.g., WiFi, WiMax, Bluetooth and the like).

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that embodiments of the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A system comprising:
one or more microsensors configured to measure one or more signals indicative of one or more near-product engagements within a retail environment, the one or more microsensors disposed on a portion of a product display within the retail environment, the one or more microsensors configured to generate an infrared curtain defined by a conic section, the infrared curtain extending across a portion of the product display supporting a product within the retail environment, the one or more signals indicative of the one or more near-product engagements within the product display of the retail environment including one or more disruption signals indicating a disruption with a portion of the infrared curtain;
one or more hubs communicatively coupled to each of the one or more microsensors and a network, wherein the one or more hubs are configured to receive the one or more signals indicative of one or more near-product engagements from the one or more microsensors and transmit the one or more signals indicative of one or more near-product engagements to the network;
one or more memory units;
one or more processors configured to execute a set of program instructions stored in the one or more memory units, wherein the set of program instructions is configured to cause the one or more processors to determine one or more near-product engagements based on the one or more signals indicative of one or more near-product engagements, the one or more near-product engagements including a physical interaction between a customer and one or more portions of the product display of the retail environment; and
one or more user interfaces.

2. The system of claim 1, wherein the one or more memory units and the one or more processors are disposed in a server communicatively coupled to the one or more hubs via the network.

3. The system of claim 2, wherein the one or more hubs are configured to transmit the one or more wireless signals transmitted from the one or more transmitting electronic devices to the server via the network.

4. The system of claim 3, wherein the set of program instructions is further configured to cause the one or more processors to identify spatial relationships between the one or more sensor units and the one or more transmitting electronic devices.

5. The system of claim 1, further comprising a media device communicatively coupled to the network via the one or more hubs, wherein the media device is configured to interact with the one or more portions of the product display of the retail environment.

6. The system of claim 5, wherein the set of program instructions is further configured to cause the media device to interact with the one or more portions of the product display of the retail environment.

7. The system of claim 1, wherein the hubs are configured to receive one or more signals from the network and transmits the one or more signals to at least one of the one or more microsensors or the media device.

8. The system of claim 1, wherein the one or more user interfaces are configured to provide one or more outputs to a user.

9. The system of claim 1, wherein the one or more user interfaces are configured to receive one or more inputs from a user.

10. The system of claim 1, wherein at least one of the one or more hubs is configurable to be communicatively coupled to at least another of the one or more hubs.

11. The system of claim 1, wherein the one or more hubs comprise one or more sensor units configured to receive one or more wireless signals transmitted from one or more transmitting electronic devices disposed on a portion of the product display within the retail environment.

12. The system of claim 1, wherein the product display includes a shelf configured to support the product.

13. A method comprising:
receiving one or more signals indicative of one or more near-product engagements from one or more microsensors within a retail environment, the one or more microsensors disposed on a portion of a product display within the retail environment, the one or more microsensors configured to generate an infrared curtain defined by a conic section, the infrared curtain extending across a portion of the product display supporting a product on within the retail environment, the one or more signals indicative of the one or more near-product engagements within the product display of the retail environment including one or more disruption signals indicating a disruption with a portion of the infrared curtain;
transmitting the one or more signals indicative of one or more near-product engagements to a network; and
determining one or more near-product engagements based on the one or more signals indicative of one or more near-product engagements, the one or more near-product engagements including a physical interaction between a customer and one or more portions of the product display of the retail environment.

14. The method of claim 13, wherein determining one or more near-product engagements based on the one or more signals indicative of one or more near-product engagements comprises determining at least one of a movement of a product or determining a temperature variance within the one or more portions of the product display of the retail environment.

15. The method of claim 14, further comprising providing one or more outputs based on the one or more near-product engagements to a user via a user interface.

16. The method of claim 13, wherein the product display includes a shelf configured to support the product.

17. A method comprising:
receiving one or more wireless signals transmitted by one or more transmitting electronic devices with one or more sensor units;
transmitting the one or more wireless signals to a server;
generating spatial relationship data associated with one or more spatial relationships between one or more transmitting electronic devices and one or more sensor units disposed on a portion of a product display within a retail environment;
performing one or more filtering steps on the spatial relationship data, the one or more filtering steps based on at least one of ownership data of the one or more transmitting electronic devices, manufacturer data of the one or more transmitting electronic devices, repeated spatial relationship patterns of the one or more transmitting electronic devices, movement data of the one or more transmitting electronic devices, or one or more received signal strength indicator values of the one or more received wireless signals;

transmitting the filtered spatial relationship data to a user interface; and providing one or more outputs based on the filtered spatial relationship data via the user interface.

18. The method of claim 17, wherein the product display includes a shelf configured to support a product.

* * * * *